US008923914B2

(12) United States Patent
Kim et al.

(10) Patent No.: US 8,923,914 B2
(45) Date of Patent: Dec. 30, 2014

(54) RE-CONFIGURABLE BUILT-IN ANTENNA FOR PORTABLE TERMINAL

(75) Inventors: Jin-U Kim, Seoul (KR); Austin Kim, Seongnam-si (KR); Dong-Hwan Kim, Hwaseong-si (KR); Jae-Ho Lee, Yongin-si (KR); Jung-Ho Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 760 days.

(21) Appl. No.: 13/100,445

(22) Filed: May 4, 2011

(65) Prior Publication Data

US 2011/0275333 A1 Nov. 10, 2011

(30) Foreign Application Priority Data

May 10, 2010 (KR) ........................ 10-2010-0043519

(51) Int. Cl.

| | |
|---|---|
| ***H04M 1/00*** | (2006.01) |
| ***H01Q 11/12*** | (2006.01) |
| ***H01Q 9/16*** | (2006.01) |
| ***H01Q 7/00*** | (2006.01) |
| ***H01Q 9/04*** | (2006.01) |
| ***H01Q 1/24*** | (2006.01) |

(52) U.S. Cl.

CPC ............. *H01Q 1/243* (2013.01); *H01Q 9/0421* (2013.01); *H01Q 9/0442* (2013.01)
USPC ......... 455/550.1; 343/723; 343/823; 343/868

(58) Field of Classification Search

CPC ..... H01Q 1/243; H01Q 9/0407; H01Q 1/245; H04B 1/0053; H04B 1/3838
USPC .................. 455/82, 550.1, 552.1, 553.1, 101, 455/127.4, 132, 133, 188.1; 343/714, 723, 343/823, 861, 868
See application file for complete search history.

(56) References Cited

U.S. PATENT DOCUMENTS

| | | | | |
|---|---|---|---|---|
| 6,693,594 | B2 * | 2/2004 | Pankinaho et al. | 343/700 MS |
| 7,808,433 | B2 * | 10/2010 | Rutfors et al. | 343/700 MS |
| 8,373,609 | B1 * | 2/2013 | Dorsey et al. | 343/769 |
| 2006/0055606 | A1 | 3/2006 | Boyle | |
| 2007/0018895 | A1 * | 1/2007 | Bolin | 343/702 |
| 2007/0222697 | A1 | 9/2007 | Caimi et al. | |
| 2009/0251383 | A1 | 10/2009 | Tani et al. | |

(Continued)

FOREIGN PATENT DOCUMENTS

| | | | |
|---|---|---|---|
| CN | 1792041 | A | 6/2006 |
| JP | 2000-278024 | A | 10/2000 |

(Continued)

*Primary Examiner* — Andrew Wendell
(74) *Attorney, Agent, or Firm* — Jefferson IP Law, LLP

(57) ABSTRACT

A re-reconfigurable built-in antenna of a portable terminal is provided. The antenna includes an antenna radiator having a feeding pad electrically connected to a feeding portion of a main board of the terminal and at least one ground pad disposed in a position different from that of the feeding pad for selectively establishing an electrical connection to a ground portion of the terminal, and a switching element, commonly connected to the at least one ground pad of the antenna radiator, for selectively establishing an electrical connection to the ground portion by a switching operation. The antenna radiator changes a shape of the antenna radiator by using the selective electrical connection of the ground portion so as to have various operational frequency bands and radiation properties.

13 Claims, 5 Drawing Sheets

(56) References Cited

U.S. PATENT DOCUMENTS

| | | | | |
|---|---|---|---|---|
| 2010/0295737 | A1* | 11/2010 | Milosavljevic et al. | 343/702 |
| 2011/0057857 | A1* | 3/2011 | Nagano et al. | 343/876 |
| 2011/0065477 | A1* | 3/2011 | Ko et al. | 455/562.1 |
| 2011/0175776 | A1* | 7/2011 | Anguera et al. | 343/700 MS |
| 2013/0154894 | A1* | 6/2013 | Caimi et al. | 343/858 |

FOREIGN PATENT DOCUMENTS

| | | | |
|---|---|---|---|
| JP | 2001-326514 | A | 11/2001 |
| JP | 2005-524322 | A | 8/2005 |
| JP | 3772785 | B2 | 5/2006 |
| JP | 2006-174095 | A | 6/2006 |

* cited by examiner

RE-CONFIGURABLE BUILT-IN ANTENNA FOR PORTABLE TERMINAL

PRIORITY

This application claims the benefit under 35 U.S.C. §119 (a) of a Korean patent application filed in the Korean Intellectual Property Office on May 10, 2010 and assigned Serial No. 10-2010-0043519, the entire disclosure of which is hereby incorporated by reference.

BACKGROUND OF THE INVENTION

1. Field of the Invention

The present invention relates to a built-in antenna of a portable terminal. More particularly, the present invention relates to a re-configurable built-in antenna of a portable terminal implemented for changing a shape of an antenna radiator by using a switching operation, so that it is effectively changed to a desired band and radiation pattern.

2. Description of the Related Art

Recently introduced portable terminals have various functions and designs. In addition, as the portable terminals are gradually becoming slimmer, lighter, and thinner, the functions of the portable terminals are more emphasized. To satisfy such costumers' demands, it is important to reduce the volume of the portable terminals while maintaining or improving the functions of the terminals.

More particularly, the aforementioned portable terminals can use antennas with the same antenna radiator at various bands, and thus the antenna radiator is changed or replaced to the minimum extent possible when there is a change in bands or radiation patterns. Therefore, there is an ongoing competition to decrease a size of the portable terminal and a Specific Absorption Rate (SAR) of electromagnetic waves of a terminal user.

As the antenna of the portable terminal uses a built-in antenna radiator, a Planar Inverted-F Antenna (PIFA) type has been implemented in recent years.

However, there is a problem in that the PIFA-type antenna has a fixed frequency property when a pattern, a feeding position, and a shorting point position are determined and in that the size of the antenna has to be increased in proportion to the number of supported bands.

In order to address this problem, a switching element capable of changing a position of an antenna ground may be placed, or the switching element may be placed on a path around an antenna signal input part so as to change an electrical length, which is used as a switching method at a frequency band of Global System for Mobile Communications (GSM) 850/900.

As the portable terminal becomes smaller and slimmer, the antenna occupies a very limited space in the terminal. However, global roaming and integration of communication services require implementation of a multi-band antenna. Since various resonance lengths should be implemented in the multi-band antenna, it is difficult to support all multiple bands required in a decreased antenna space, and performance deteriorates in some bands since an antenna gain is not sufficiently ensured. To address this problem, different antennas can be developed according to regions where portable terminals are used even if the portable terminals have the same design and hardware structure. However, this is not a proper method where customers want to use one terminal regardless of where they travel in the world. In addition, additional development costs are incurred due to antenna modification, and a delay in development schedule, a mechanical change for ensuring performance required in each region, approval costs, etc., are also problematic from the perspective of manufacturers.

As one method of addressing the aforementioned problems, a band control antenna can be used by utilizing an additional end portion connected to a switch so that it can be closed/opened with respect to a fixed end portion.

However, the design of the antenna may be limited when using this method since the position and pattern of the end portion connected to the switch are selected under the influence of the fixed end portion. Therefore, it may be difficult to design an antenna space in the complex structure due to various designs of the portable terminal.

In addition, antennas having the aforementioned structure can use this method in which a resonance frequency is changed through GSM 850 and GSM 900 band switching so that only a multi-band function can be processed by using the same antenna. Therefore, a change in the radiation pattern of the related art or an influence on the human body is not taken into account in this method.

Therefore, a need exists for a re-configurable built-in antenna of a portable terminal implemented to be able to exhibit a satisfactory radiation property even if a space for installing the same antenna radiator is used.

SUMMARY OF THE INVENTION

Aspects of the present invention are to address the above-mentioned problems and/or disadvantages and to provide at least the advantages described below. Accordingly, an aspect of the present invention is to provide a re-configurable built-in antenna of a portable terminal implemented to be able to exhibit a satisfactory radiation property even if a space for installing the same antenna radiator is used.

Another aspect of the present invention is to provide a re-configurable built-in antenna of a portable terminal implemented to be able to change a shape of the same antenna radiator that operates by using only a simple switching operation.

Another aspect of the present invention is to provide a re-configurable built-in antenna of a portable terminal implemented to be able to decrease an absorption rate of electromagnetic waves while changing a desired band and radiation pattern by using only a simple switching operation.

In accordance with an aspect of the present invention, a re-reconfigurable built-in antenna of a portable terminal is provided. The antenna includes an antenna radiator having a feeding pad electrically connected to a feeding portion of a main board of the terminal and at least one ground pad which is disposed in a position different from that of the feeding pad for selectively establishing an electrical connection to a ground portion of the terminal, and a switching element, commonly connected to the at least one ground pad of the antenna radiator, for selectively establishing an electrical connection to the ground portion by a switching operation, wherein the antenna radiator changes a shape of the antenna radiator by using the selective electrical connection of the ground portion so as to have various operational frequency bands and radiation properties.

In accordance with another aspect of the present invention, a multi-band portable terminal is provided. The multi-band portable terminal includes a main board, an antenna radiator having a feeding pad electrically connected to a feeding portion of the main board and at least one ground pad which is disposed in a position different from that of the feeding pad for selectively establishing an electrical connection to a ground portion of the terminal, a switching element, commonly connected to the at least one ground pad of the antenna radiator, for selectively establishing an electrical connection to the ground portion by a switching operation, and a controller for controlling the switching element so that the antenna radiator has a radiation pattern corresponding to a frequency band used by the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
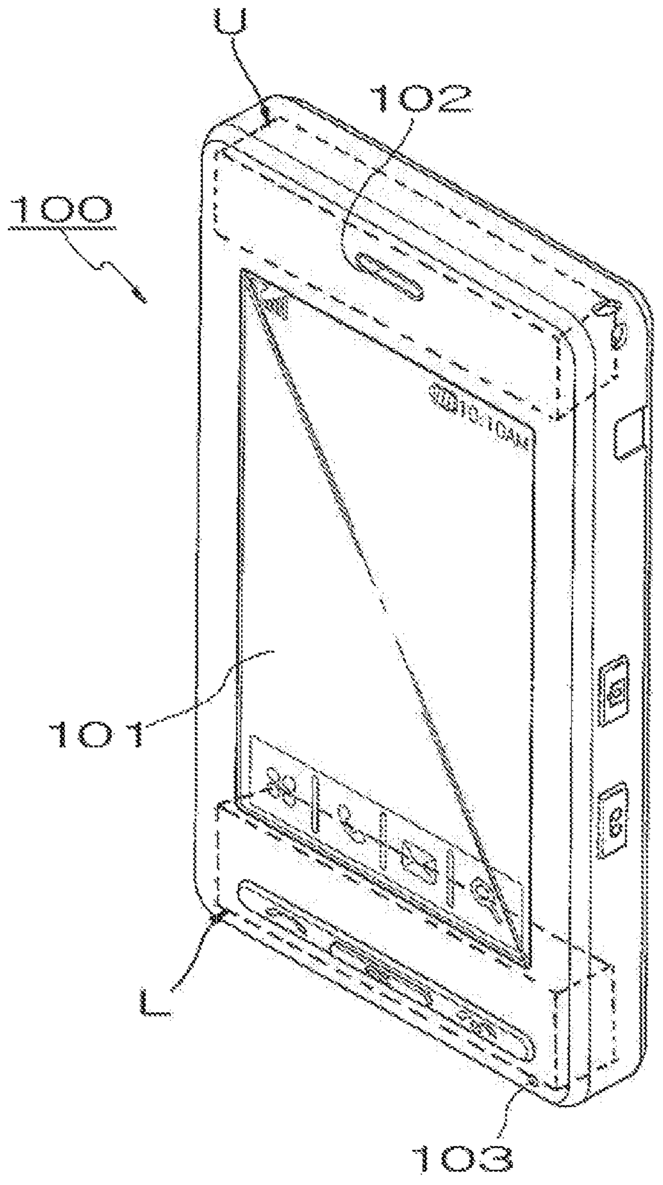
FIG. 1 is a perspective view of a portable terminal employing a built-in antenna according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although a bar-type terminal is illustrated herein, exemplary embodiments of the present invention are not limited thereto. Thus, a re-configurable built-in antenna of exemplary embodiments of the present invention can also apply to various terminals of an open type (e.g., a slide-type terminal, a folder-type terminal, etc.).

FIGS. 1 through 5C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a perspective view of a portable terminal employing a built-in antenna according to an exemplary embodiment of the present invention.

Referring to FIG. 1, a portable terminal 100 includes a wide Liquid Crystal Display (LCD) module 101 installed in a front surface of the portable terminal 100. For example, the LCD module 101 is installed with a touch screen. An upper portion of the LCD module 101 is installed with an earpiece 102 as a receiver. A lower portion of the LCD module 101 is installed with a microphone 103 as a transmitter. Although not shown, a camera module and a speaker module may further be installed, and various additional devices may be installed to implement other well-known additional functions.

A built-in antenna 1, described in FIG. 2 below, can be placed in various positions of the portable terminal 100. Although the built-in antenna has been located in an upper portion U of the terminal, it is inevitable to change the location of the built-in antenna since there is not enough space to install the antenna (e.g., due to the installation of a camera module, etc.). Therefore, the antenna is installed in a lower portion L of portable terminals of the related art.

In the built-in antenna of exemplary embodiments of the present invention, a shape of an antenna radiator is changed according to a switching operation of a switching element, and thus there is a change in a radiation pattern. Therefore, the antenna radiator can operate at a desired band (e.g., a Global System for Mobile Communications (GSM) 850 band, a GSM 900 band, etc.) by using the switching operation. More particularly, the same structured antenna radiator can operate in various manners, such as a Planar Inverted-F Antenna (PIFA), an Inverter-F Antenna (IFA), an Inverted-L Antenna (ILA), etc., according to the switching operation.

Figure 2:
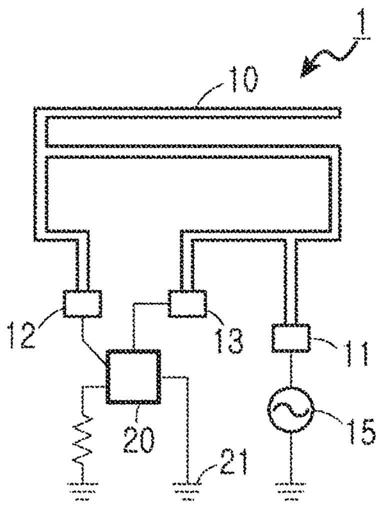
FIG. 2 is a schematic view of a built-in antenna according to an exemplary embodiment of the present invention.

FIG. 2 is a schematic view of a built-in antenna according to an exemplary embodiment of the present invention.

Referring to FIG. 2, a built-in antenna 1 includes an antenna radiator 10 having a specific pattern. The antenna radiator 10 may have one feeding pad 11 and two ground pads 12 and 13. The feeding pad 11 is electrically connected to a feeding portion (Radio Frequency (RF) connector) 15 of a main board (not shown) of the terminal. The two ground pads 12 and 13 are selectively connected to a ground portion 21 of the main board. However, the present invention is not limited thereto, and thus the ground pad can be grounded to various ground members implemented on the terminal. Therefore, a specific switching element 20 is disposed between the two ground pads 12 and 13 and the ground portion 21. The switching element 20 may be one of various well-known switching devices, such as a Single Pole Double Throw (SPDT), a Single Pole Single Throw (SPST), a Single Pole Triple Throw (SP3T), a Single Pole Four Throw (SP4T), and the like.

Although exemplary embodiments of the present invention provide the two ground pads 12 and 13 to be switched, these are to be regarded as merely exemplary. For example, two or more ground pads can be constructed and switched in various manners. In addition, the shape of the antenna radiator can be changed in structure by branching off one ground pad from the antenna radiator and by turning on/off the ground pad by the switching element.

Figure 3A:
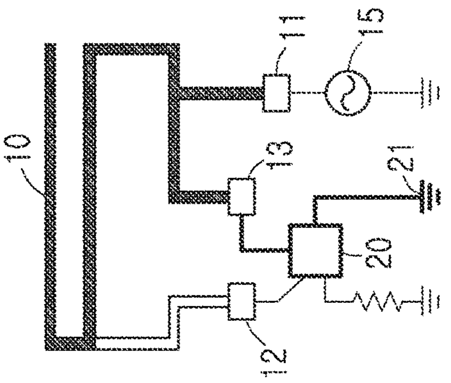
FIGS. 3A through 3C illustrate a change in a shape of an antenna radiator in various manners based on a switching operation according to exemplary embodiments of the present invention.
Figure 3B:
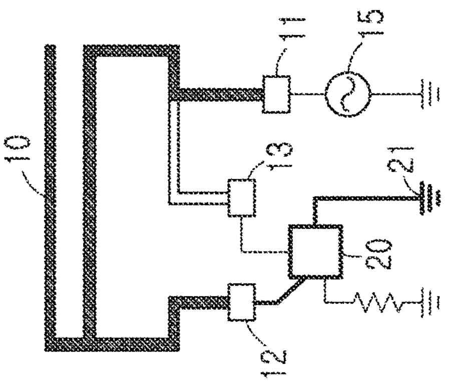
Figure 3C:
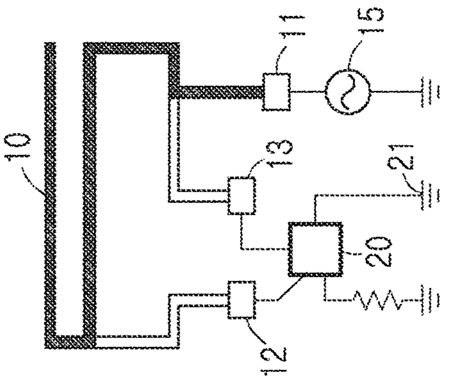

FIGS. 3A through 3C illustrate a change in a shape of an antenna radiator in various manners based on a switching operation according to exemplary embodiments of the present invention.

Referring to FIG. 3A, only one of two ground pads 12 and 13 are electrically connected to a ground portion 21. In this case, the antenna radiator 10 can operate as an Inverter-F Antenna (IFA).

Referring to FIG. 3B, only the remaining one ground pad 12 is electrically connected to the ground portion 21. In this case, the antenna radiator 10 can operate as a loop-type antenna radiator.

Referring to FIG. 3C, both of the two ground pads 12 and 13 are open with respect to the ground portion 21. In this case, the antenna radiator 10 can operate as an Inverted-L Antenna (ILA).

As a result, an electrical connection is selectively established to at least one ground pad coupled to the switching element according to the operation of the switching element, and thus the shape of the antenna radiator can change so that the antenna radiator operates at a desired band.

Figure 4C:
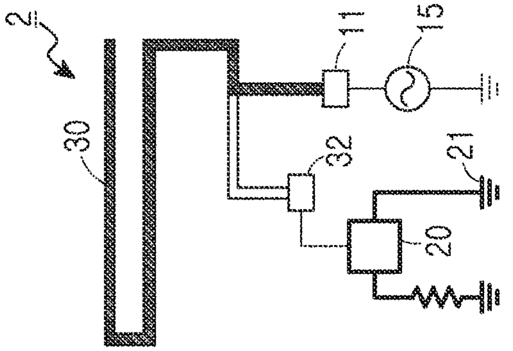
FIGS. 4A through 4C illustrate a built-in antenna and a change in a shape of an antenna radiator in various manners based on an operation of a switching element according to exemplary embodiments of the present invention.
Figure 4B:
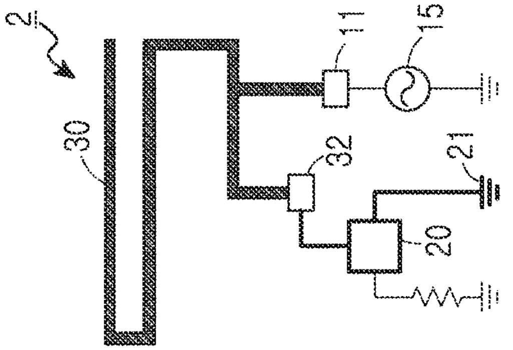
Figure 4A:
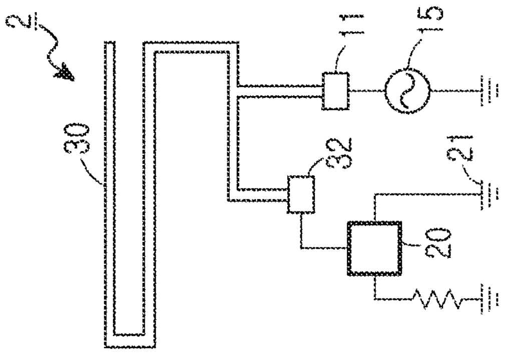

FIGS. 4A through 4C illustrate a built-in antenna and a change in a shape of an antenna radiator in various manners based on an operation of a switching element according to exemplary embodiments of the present invention.

More particularly, a change in a shape of an antenna radiator 30, of a built-in antenna 2, based on an operation of a switching element is illustrated in FIGS. 4A through 4C.

Referring to FIG. 4A, only one ground pad 32 is connected to a ground portion 21 of a terminal via the switching element 20. The switching element 20 is equivalent to the switching element of FIG. 2.

Referring to FIG. 4B, a ground portion 21 and a ground pad 32 are electrically connected to each other by the switching element 20, and thus the antenna radiator can operate as an IFA.

Referring to FIG. 4C, a ground portion 32 is open by a switching element 20, and only a feeding pad 11 is electrically connected to a feeding portion 15 of the terminal. In this case, the antenna radiator 30 can operate as an ILA.

Figure 5A:
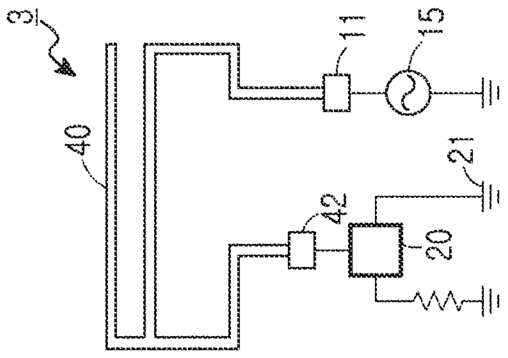
FIGS. 5A through 5C illustrate a built-in antenna and a change in a shape of an antenna radiator in various manners based on an operation of a switching element according to exemplary embodiments of the present invention.
Figure 5B:
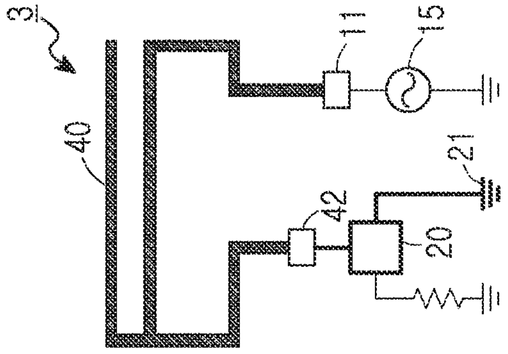
Figure 5C:
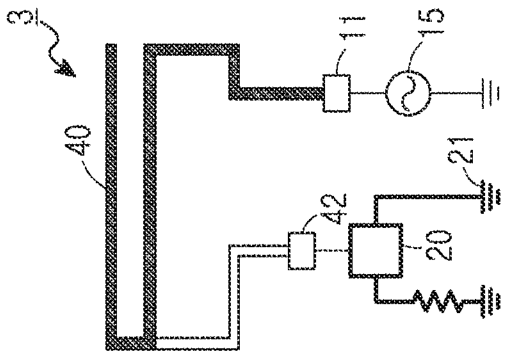

FIGS. 5A through 5C illustrate a built-in antenna and a change in a shape of an antenna radiator in various manners based on an operation of a switching element according to exemplary embodiments of the present invention.

More particularly, a change in a shape of an antenna radiator 40, of a built-in antenna 3, based on an operation of a switching element is illustrated in FIGS. 5A through 5C.

Referring to FIG. 5A, only one ground pad 42 is connected to a ground portion 21 of a terminal via switching element 20.

Referring to FIG. 5B, a ground portion 21 and a ground pad 42 are electrically connected to each other by means of switching element 20, and thus the antenna radiator can operate as an IFA.

Referring to FIG. 5C, a ground portion 21 is open by a switching element 20, and only a feeding pad 11 is electrically connected to a feeding portion 15 of the terminal. In this case, the antenna radiator 40 can operate as an ILA.

Although not shown in the aforementioned various exemplary embodiments of the present invention, at least one matching circuit (e.g., resistance, inductance, capacitance, etc.) can be additionally implemented in series or parallel between the ground pad and the ground portion or between the feeding pad and the feeding portion.

As a result, the structure of the antenna radiator can be changed in such a manner that an electrical connection is selectively established by using a specific switching element to turn on/off at least one ground pad branched off from the antenna radiator. This implies that a radiation pattern and a frequency change can be implemented as desired by using a switching device without changes in a hardware structure of the same structured antenna radiator.

According to exemplary embodiments of the present invention, since a desired radiation pattern can be implemented by changing a shape of an antenna radiator of a built-in antenna by the use of a switching operation, there is an advantage in that a portable terminal can become slim while implementing a high radiation property at a specific band.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A re-reconfigurable built-in antenna of a portable terminal, the antenna comprising:

an antenna radiator having a feeding pad electrically connected to a feeding portion of a main board of the terminal and at least one ground pad disposed in a position different from that of the feeding pad for selectively establishing a direct electrical connection to a ground portion of the terminal; and a switching element, commonly connected to the at least one ground pad of the antenna radiator, for selectively establishing an electrical connection to the ground portion by a switching operation, wherein the antenna radiator changes an electrical length of the antenna radiator by using the selective electrical connection of the ground portion so as to have various operational frequency bands and radiation properties.

2. The antenna of claim 1, wherein a position of each of the ground pads is selected by considering a space for installing the antenna radiator depending on a specific operational frequency band and radiation property of the antenna radiator.

3. The antenna of claim 1, wherein the number of ground pads to be formed is 2 so that the two ground pads are respectively branched off from a pattern of the antenna radiator and are electrically connected to an output electrode of the switching element, and so that a common electrode is electrically connected to the ground portion.

4. The antenna of claim 1, wherein the electrical length of the antenna radiator is changed in structure by branching off one ground pad from the antenna radiator and by turning on/off the ground pad by the switching element.

5. The antenna of claim 3, wherein the antenna radiator operates as at least one of an Inverted-F Antenna (IFA), a loop-type antenna, and an Inverted-L Antenna (ILA) according to an operation of the switching element.

6. The antenna of claim 1, wherein a matching circuit is provided in series or parallel to a ground line between the ground pad and the switching element or between the switching element and the ground portion.

7. The antenna of claim 6, wherein the matching circuit is one or more combinations of a Capacitance (C), a Resistance (R), and a Reactance (L).

8. The antenna of claim 1, wherein the switching element is at least one of a Single Pole Double Throw (SPDT), a Single Pole Single Throw (SPST), and a Single Pole Triple Throw (SP3T).

9. A multi-band portable terminal, the terminal comprising:

a main board;

an antenna radiator having a feeding pad electrically connected to a feeding portion of the main board and at least one ground pad disposed in a position different from that of the feeding pad for selectively establishing a direct electrical connection to a ground portion of the terminal;

a switching element, commonly connected to the at least one ground pad of the antenna radiator, for selectively establishing an electrical connection to the ground portion by a switching operation; and a controller for controlling the switching element so that the antenna radiator has an electrical length corresponding to a frequency band used by the terminal.

10. The terminal of claim 9, wherein a position of each of the ground pads is selected by considering a space for installing the antenna radiator depending on a specific operational frequency band and radiation property of the antenna radiator.

11. The terminal of claim 9, wherein the electrical length of the antenna radiator is changed in structure by branching off one ground pad from the antenna radiator and by turning on/off the ground pad by the switching element.

12. The terminal of claim 10, wherein the antenna radiator operates as at least one of an Inverted-F Antenna (IFA), a loop-type antenna, and an Inverted-L Antenna (ILA) according to an operation of the switching element.

13. The terminal of claim 9, wherein the switching element is at least one of a Single Pole Double Throw (SPDT), a Single Pole Single Throw (SPST), and a Single Pole Triple Throw (SP3T).

* * * * *